United States Patent [19]

Debsikdar

[11] Patent Number: 4,830,879
[45] Date of Patent: May 16, 1989

[54] BROADBAND ANTIREFLECTIVE COATING COMPOSITION AND METHOD

[75] Inventor: Jagadish Debsikdar, Columbus, Ohio

[73] Assignee: Battelle Memorial Institute, Columbus, Ohio

[21] Appl. No.: 911,577

[22] Filed: Sep. 25, 1986

[51] Int. Cl.$^4$ .............................................. B05D 5/06
[52] U.S. Cl. .................................... 427/162; 427/164; 427/165; 427/376.2
[58] Field of Search ............... 427/205, 190, 165, 203, 427/376.2, 162, 164, 126.5, 126.6; 428/428, 482

[56] References Cited

U.S. PATENT DOCUMENTS

| | | | |
|---|---|---|---|
| 4,272,588 | 6/1981 | Yoldas et al. | 427/165 |
| 4,361,598 | 11/1982 | Yoldas | 427/74 |
| 4,465,739 | 8/1984 | Yoldas | 427/165 |
| 4,535,026 | 8/1985 | Yoldas et al. | 427/165 |
| 4,596,745 | 6/1986 | Chao | 427/165 |

FOREIGN PATENT DOCUMENTS 0191220  11/1982  Japan .................................. 427/165

*Primary Examiner*—Janyce Bell
*Attorney, Agent, or Firm*—Klaus H. Wiesmann

[57] ABSTRACT

The invention relates to antireflective coatings and to a process for depositing the antireflective coatings on solar collector cover plates, optical elements such as lenses and windows in high-energy visible and near-IR lenses and on other glass or metal or metal-alloy or single crystal surfaces, including the steps of hydrolyzing an alkoxysilane, titanium alkoxide, aluminum alkoxide, tantalum alkoxide, niobium alkoxide, or other alkoxy compounds, or a mixture thereof, depending upon the final coating composition desired; to prepare polymeric solutions of the alkoxy compound/or compounds in which the polymer molecules or macromolecules (i.e. the primary particles) grow with time; depositing layers of coatings from the polymeric solutions by state of the art processes (such as spraying, dipping or spinning method), and drying to form chemically bound microporous gel layers; thermally treating the gel-coating in a manner adapted to remove solvent, excess water and residual organics from the gel coating. Microporous coatings produced by the above procedure will be characterized by graded particles and hence graded porosity across the coating thickness, —larger porosity on the top surface and smaller porosity in the substructure—, and will have gradual transition of refractive index (i.e. graded refractive index) across the coating thickness. Coatings produced by the process of this invention can be used to reduce or eliminate reflection losses from surfaces of transmitting optical elements over a wide spectrum of light waves.

13 Claims, 20 Drawing Sheets

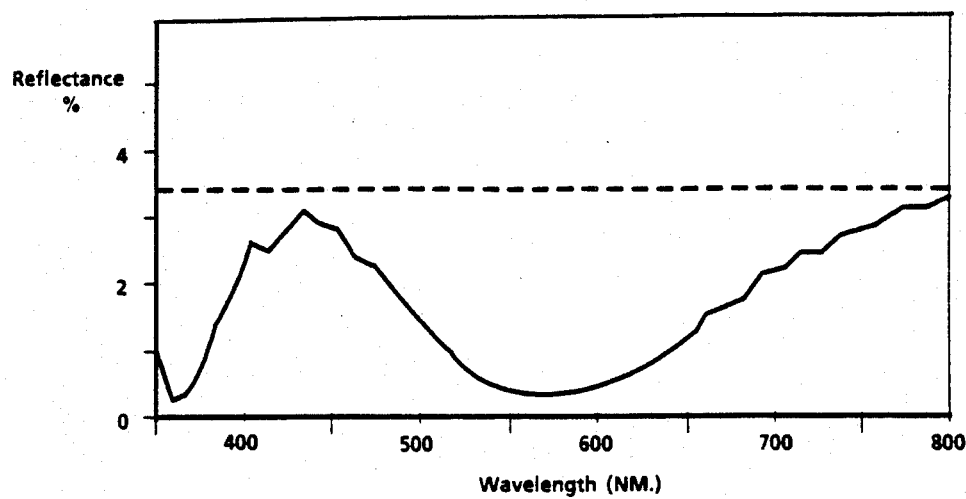
FIGURE 3. PERCENT REFLECTANCE OF HEAT-TREATED PROCEDURE I COATING
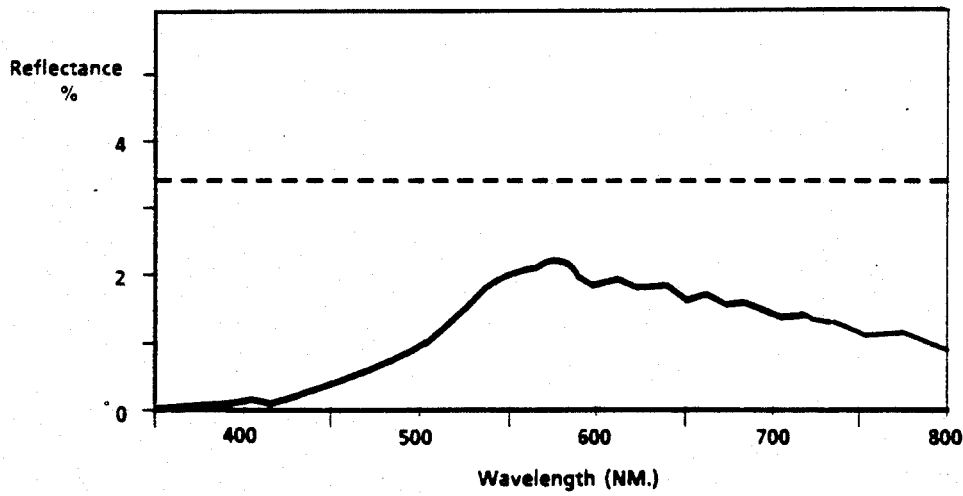
FIGURE 4. PERCENT REFLECTANCE OF HEAT-TREATED PROCEDURE II COATING

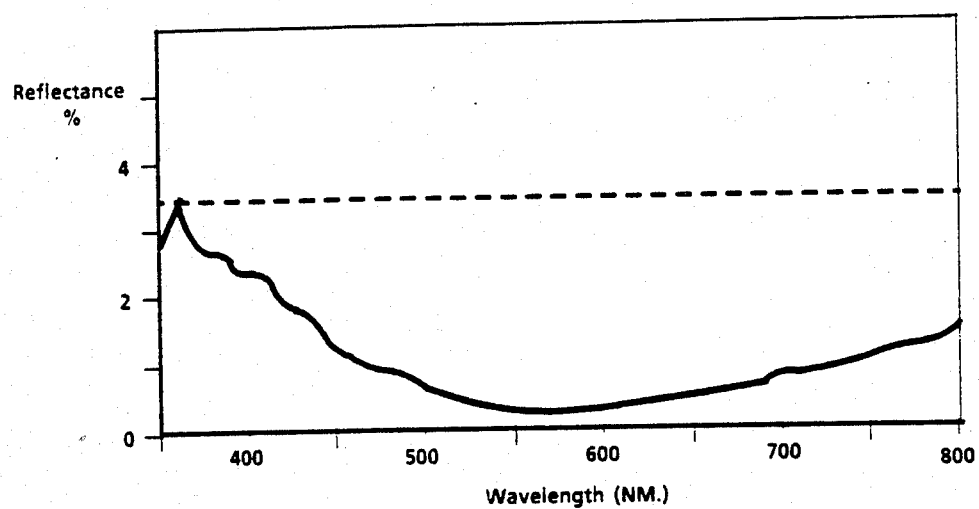
FIGURE 5. PERCENT REFLECTANCE OF HEAT-TREATED PROCEDURE III COATING

BROADBAND ANTIREFLECTIVE COATING COMPOSITION AND METHOD

FIELD OF THE INVENTION

This invention relates to a process for depositing gradient-index antireflective coatings on optical elements using nonaqueous precursor solutions of one or more alkoxide compounds or a mixture thereof or a mixture of an alkoxide and metal salts depending upon the coating composition desired. The antireflective coatings thus produced have utility in laser optics and solar cells, among others.

BACKGROUND OF THE INVENTION

In optical systems a significant amount of light intensity is lost due to back reflection at the surfaces of the transmitting optical element. This loss increases as the angle of incidence of the light increases. The loss of transmission resulting from back reflection is cumulative in systems where multiple optical elements are used. This loss of energy could be largely reduced or eliminated by modifying the index of refraction of the surfaces of the transmitting optical element relative to the bulk material. Since reflection is a function of the refractive index the most conventional approach to improve the efficiency of the optical system has been to coat the surface of the optical element with a transparent material that has a refractive index equal to square root of that of the transmitting optical element. Theoretically, a quarter-wavelength-thick coating of this material reduces surface reflection to zero at that wavelength for one given angle of incidence. However, there is a need for broadband (i.e. a range of wavelengths) wide-angle (i.e. a range of angles of incidence) coatings for solar energy applications and for coatings that will withstand higher power densities in laser optics. This requirement cannot be fully met by the above coating method. A coating of tailored refractive index gradient across the coating-thickness is required to reduce reflection losses over a wide range of wavelengths and angles of incidence.

At present several methods are available for producing a graded-index antireflective surface. A brief outline of the reported methods and the limitations of each of those methods is given below.

A first method is to deposit multilayer coatings each made from different transparent materials. The choice of coating materials and the thickness of each layer of the coating should be such that a refractive index gradient is formed across the thickness of the multilayer coating. The main limitations of this method are: (1) the process is somewhat complicated and, as such, commercial production of this type of coating is difficult; and (2) such a coating when used in a high power pulsed laser shows poor laser-damage resistance.

A second method is to introduce graded porosity in a glass surface by selective leaching of phase separated glasses using an $NH_4F.HF$ solution. Sodium-borosilicate and soda-lime-silica glasses with antireflective properties have been developed by this approach. The main limitation of this method is that the method is applicable to only those glasses which on heat treatment produce a leachable phase on a submicroscopic/microscopic scale.

A third method is to leach the glass directly with a solution of 0.034M $Na_2HAsO_4$ and 0.013M $Al^{+3}$ in distilled water at 87° C. in a constant temperature bath. This process, which is claimed to be very controllable and reproducible, produces a broad reflectance minimum. Graded index antireflective films on Schott BK-7 borosilicate glass have been produced by this method. The applicability of this method on other glass systems has not yet been reported.

A fourth method is based on the sol-gel process of depositing a microporous gel-coating which, on thermal treatment and pore size tailoring, acquires the antireflective property. The gel-coating is deposited using a solution prepared by partial hydrolysis of an appropriate alkoxide precursor material. Subsequently, the gel-coating is subject to a thermal treatment to remove the volatiles and to partially densify the coating. Finally, the coated surface(s) is immersed in an $NH_4F.HF$ solution for chemical etching in order to modify the pore-morphology of the coating across its thickness. This method has been used to deposit antireflective silica and borosilicate "glass-like" coatings on various glass substrates. The main advantage of this method is that by this method broadband antireflective coatings can be deposited on glasses of essentially any composition. However, this method has the following practical problems: (1) any minor change in the composition of the etching solution or the temperature of the etching solution or the duration of etching can influence the porosity grading of the coating quite considerably; (2) very often it becomes difficult to prevent severe enlargement of the surface pores relative to the substructure of the coating; and (3) if the etched surface is not properly cleaned by washing, particulate material may remain in the pores of the coating. Because of these problems it is extremely difficult to obtain reproducible antireflective properties with these coatings.

A fifth method is based on the sol-gel process. The main difference between this method and the fourth method is that in this method a suitable acid soluble dopant is added to the solution which is used for depositing a microporous gel-coating. Other processing steps of this method are similar to those of the fourth method. The main purpose of adding a dopant in the coating-solution is that when the thermally consolidated gel-coating derived from such a solution is chemically etched, a concentration gradient of the dopant element could develop across the coating thickness. This assists in developing a refractive index gradient. Modification of the pore morphology of the coating further contributes to the gradient. However, the practical problems of this method are similar to those of the fourth method. Moreover, sometimes additional problems arise due to the fact that it is extremely difficult to completely wash out the leached dopant. The presence of residual dopant may cause scattering problems. For the above reasons it is very difficult to obtain reproducible antireflective properties by this method.

Examples of prior art U.S. Pat. Nos. include 2,490,662; 2,707,899; 3,984,581; 4,004,851; 4,086,074; 4,190,321; 4,340,276; and 4,497,539.

In spite of the availability of the above methods there is a need for a more efficient, cost effective, reproducible, commercially acceptable method for producing broadband antireflective coatings. These coatings have applications in laser optics and solar cells, among others. The present invention meets this need.

BRIEF DESCRIPTION OF THE FIGURES

FIG. 3 illustrates the % reflectance versus wavelength for a coating produced by Procedure I.

FIG. 4 illustrates the % reflectance versus wavelength for a coating produced by Procedure II.

FIG. 5 illustrates the % reflectance versus wavelength for a coating produced by Procedure III.

SUMMARY OF THE INVENTION

Figure 1:
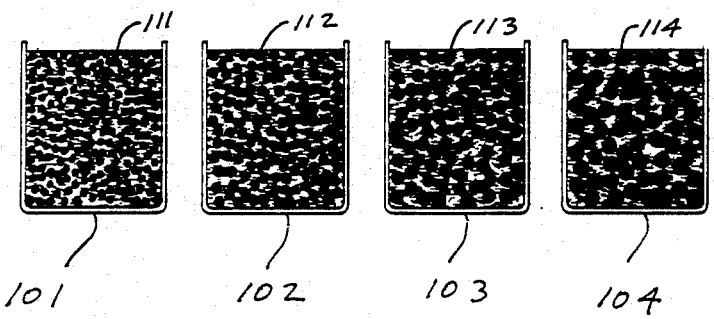
FIG. 1 illustrates four solutions containing particles of increasing size ranges.

In accordance with the present invention, a method is provided whereby broadband antireflective coating maybe deposited on any optical element by a sol-gel process. Partially polymeric nonaqueous solutions are prepared by hydrolysis and polycondensation reactions of one or more metal alkoxide compound(s). The type of alkoxides that are selected depend upon the desired composition of the coating material. As a result of the hydrolytic polycondensation reactions macromolecules or fine particles are formed in these solutions which grow with time due to continued reactions. The selected optical element is repeatedly coated from these solutions which underwent different aging periods. The sequence of coating should be as follows. The substrate will be coated from solutions where each subsequent solution has increasing particle sizes; thus, the solution which contains the minimum size particles will be used to deposit the first layer, and the solution which contains the largest size particles will be used to deposit the last layer. The gel derived coating produced in this way is characterized by graded particles and, hence, graded porosity across the coating thickness. The graded porosity in turn results in graded refractive index across the coating thickness.

Definitions

The term solution as used herein shall include a sol.

The term aging as used herein shall describe the process of allowing the hydrolysis and polycondensation reactions to proceed for a fixed time. This aging will allow the tailoring of individual solutions having particular particle size characteristics.

It is to be understood that each solution will not contain particles of exactly the same particle size. Rather, the particles will have a mean size with a range of particle sizes above and below the mean.

The features and advantages of the invention will be better understood from the following detailed description.

DETAILED DESCRIPTION OF THE INVENTION AND PREFERRED EMBODIMENT

A broadband antireflective coating can be deposited by the method of the invention in several ways, by using a solution of a selected alkoxide precursor material prepared by reacting the alkoxide with water in a suitable solvent; (1) by coating the substrate repeatedly from the same solution after predetermined time intervals; and (2) by coating from a series of solutions of the same solution composition(s) but aged for different time periods.

The use of one or more dopants in the previous methods allows the deposition of multicomponent coating material of the desired chemical composition. Such multicomponent coating materials may comprise various combinations of the oxides of silicon, aluminum, boron, germanium, phosphorus, titanium, tantalum, niobium and the like which are derived from appropriately aged solutions of the selected alkoxides of those elements. Ultrapure broadband antireflecting coating required in laser optics can also be produced by the method of this invention by using solutions prepared by reacting ultrapure alkoxide or a mixture of alkoxides with ultrapure water with or without the presence of a catalyst. Since most of the alkoxides can be obtained in the liquid state, these could be distilled, if needed, to produce ultrapure starting materials.

Production of Single Component Coating Solution

The method of producing a coating solution is carried out by mixing an alkoxide represented by the general formula $M(OR)_x$ where M is a metal atom such as silicon, aluminum, titanium, tantalum, niobium, zirconium, and the like, R is an alkyl group, having from one to five carbon atoms, x is the valency of the metal atom, with water, $H_2O$ and an organic solvent, suitably an alcohol, $R_1$-OH, or a ketone,

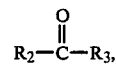

or a mixture thereof, where $R_1$ is an alkyl group having from one to five carbon atoms and $R_2$, $R_3$ are alkyl groups having from one to two carbon atoms. In some cases, depending upon the molecular structure of the alkoxide, an acid or a basic catalyst may be needed. For example, tetraethoxysilane $Si(OC_2H_5)_4$ requires an acid catalyst for complete hydrolysis whereas tetramethoxysilane $Si(OCH_3)_4$ does not require a catalyst. An acid catalyst may comprise either hydrochloric acid (HCl), nitric acid ($HNO_3$), sulfuric acid ($H_2SO_4$), acetic acid ($CH_3COOH$), or the like. A basic catalyst may comprise either ammonium hydroxide ($NH_4OH$), or diethanolamine [(HO $CH_2CH_2)_2NH$], or ethylene-diamine ($H_2N$ $CH_2CH_2NH_2$) or the like.

A catalyst can also be used to control the size of the polymer macromolecules (i.e. the particles) in the coating solution. It is believed that the acid catalyst produces smaller particles while the basic catalyst produces larger particles. In any case the size of the particles in a given solution grow in size during aging as a result of continued polymerization reactions. Moreover, the rate of growth of the particles in a given solution is significantly influenced by the solution pH. As the size of the particles in a given solution grow during aging or due to increased solution pH, the viscosity of the solution increases until, finally, it "solidifies" enmass (this "solid-like" material is called a gel). Therefore, viscosity of the solution of a given composition and concentration can be related to particle sizes in that solution. In summary, the processing parameters which determine the particle size distribution of a given alkoxide solution, made up of one or more alkoxides, at a given temperature is influenced by the solution concentration, the nature and amount of the catalyst and the duration of aging, thus a qualitative idea about the rate of growth of the particles can be monitored by measuring the solution viscosity. Alternately, the particle size in the solution can be examined by state of the art transmission electron microscopy.

In using single component (oxide) precursor solutions for the coatings two approaches can be taken for preparing these solutions. One approach is to prepare solutions of the same composition in batches at predetermined intervals of time such that these solutions when used for depositions of layers had aged for different periods of time and, consequently, contain particles of different sizes. According to the second approach, a similar series of solutions can be made involving variations in preparation procedures and compositions mentioned previously such that the particle sizes in these solutions are different. A series of solutions is illustrated in FIG. 1 with solutions 101,102,103,104 having increasing particle sizes 111,112,113,114.

Production of a Multicomponent Coating Solution

It may sometimes become necessary to tailor the refractive index of the coating material to a value not obtainable from a single component coating solution. In such a case the coating solutions can be prepared by hydrolyzing mixed precursor alkoxides of the selected oxide materials as discussed. For example, silica based coatings of different refractive indices are produced by adding one or more additional components also known as dopants. Generally, such additional components comprise the alkoxides containing boron, phosphorus, germanium, and the like. The dopant alkoxide has the same general formula as the precursor alkoxides discussed above, $M_d(OR)_x$ where $M_d$ is a dopant atom selected from the group consisting of boron phosphorous, germanium, and a mixture thereof, wherein R is an alkyl group having from one to five carbon atoms and x is the valency of the dopant atom. Multicomponent coating solutions produced by the method of this invention can be used to deposit multilayer coatings after the solutions have aged for a suitable period of time to allow particle growth; or alternatively preparation procedures and composition of the coating solutions can be changed such that the compositions of each solution are different.

Coating Deposition Techniques

Three state of the art coating techniques, namely dipping, spinning, and spraying, can be used with the method of this invention for depositing the antireflective coatings. In the dipping process, the substrate is dipped into the coating solution and then withdrawn at a predetermined constant rate. In this process the factors which influence the coating thickness include: the solution concentration, the solution viscosity, the withdrawal speed and the angle of inclination of the substrate during withdrawal from the solution. In the spinning process the substrate is attached to a turntable and rotated at a predetermined speed. The coating solution is poured on the center of the substrate, preferably by means of a pipette, such that the centrifugal force spreads out the solution over the entire surface of the substrate to produce a uniform coating. For a given solution the coating thickness depends upon the speed of rotation of the turntable (or the substrate). In the spraying technique the substrate is held at the edges and the coating solution is either drained away at a constant rate or sprayed with a gun having high atomizing capacity. In this process the coating thickness is influenced by the draining rate of the given coating solution over the surface of the substrate.

Figure 2:
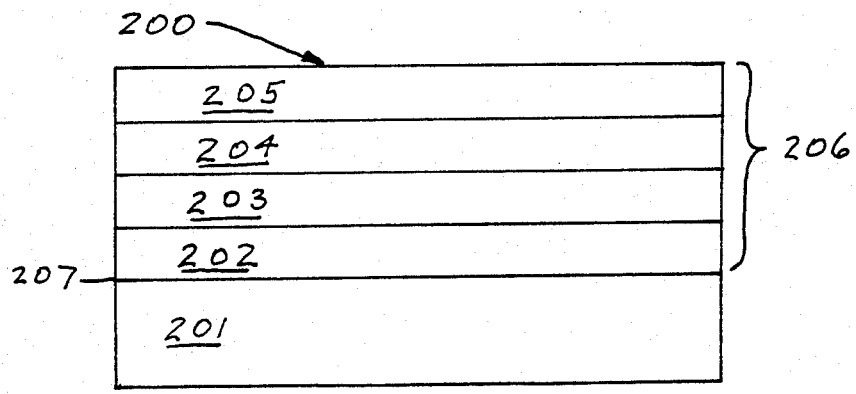
FIG. 2 illustrates the layered arrangement of the broadband antireflective coating on a substrate.

FIG. 2 illustrates the layered arrangement of the antireflective coating and substrate combination 200. A substrate 201 has deposited thereon a first coating 202 having a certain particle size, a further coating 203 is deposited thereon having a next larger particle size, coatings 204,205 have increasing particle sizes. Each coating 202,203,204,205 may be formed from more than one layer of the same solution (not shown) which together form the final antireflective coating 206. The minimum number of coatings useful in the invention is two with three or more preferred.

According to the method of this invention, the substrate 201 will be coated sequentially with thin layers of solution containing increasing particle sizes by any state of the art techniques. In this way gel coatings with increasingly larger particles from the substrate/coating interface 207 to the top most coating 205 can be deposited. Deposition parameters which determine thickness of individual layers have to be decided on the basis of the antireflective property requirements of the final product in the desired wavelength range. The method of application (dipping, spraying, spinning, etc.) will influence the thickness of each layer. Further, if it is difficult to deposit a thick layer it may be desirable to have each coating 202,203,204,205 formed from a solution having a particular particle size be formed from more than one layer. The thickness of different coatings having different size ranges can be varied to achieve the properties desired. Thus each coating having particles of a particular size range may be made up of one or more layers.

During the coating process each layer of the solution deposited on the substrate is allowed to dry at a temperature and humidity appropriate for gelation before applying the next layer. The deposition step thus includes a drying step that is integral to it since adhesion to the layer below and consolidation of the layer will not be achieved until a degree of dryness is reached where the deposited layer will not wash off in subsequent processing steps. It is important that the dryness of each intermediate layer not reach the point where no free reactive groups remain that could react with a subsequent layer to be deposited. Partial drying with the presence of some unreacted groups will increase coating adherence and strength.

Thermal Treatment

The gel coating, obtained by following procedures described in the preceding section, is then thermally treated at a temperature substantially lower than that required for complete densification of the gel-coating. The main objectives of the thermal treatment are: (1) to remove the volatiles from the gel coating such as excess water, the organic solvents present in the microporous gel coating and the residual organics, if present, in the gel structure; and (2) to consolidate the gel coating without substantially changing its pore morphology. It has been observed that a humidity treatment of the coated substrate prior to thermal treatment is more effective in removing the residual organics from the gel structure at relatively lower thermal treatment temperatures. Another method by which the structural organics are removed at comparatively lower temperature is by conducting thermal treatment in an oxidizing atmosphere or in the presence of an oxygen plasma.

It is desirable to consolidate the gel coating at lower temperatures, not exceeding, for example 900° C. The thermal treatment temperature is dependant on composition of the coating material. At higher temperatures the porous structure of the coating may collapse thus causing a loss of the antireflective properties of the coating. This illustrates the criticality of the thermal treatment schedule.

EXAMPLE 1

Four (4) batches of coating solutions of identical chemical composition were prepared at about 24-hour intervals. The method of preparation of each coating solution was as follows: 0.5 mol pure $Si(OCH_3)_4$ (tetramethoxysilane), 12.5 mol anhydrous $CH_3OH$ (methanol) and 1.0 mol distilled water were mixed in a plastic beaker. The solution mixture was stirred with a Teflon-coated magnetic stirrer for about 15 minutes at the ambient temperature under cover of a plastic wrap and the solution kept at the ambient temperature for aging. During aging the solution was stirred occasionally. The solution was transparent when prepared, but during aging it gradually became somewhat translucent. After 17 days of the preparation of the last batch of solutions these four solutions were used for coating deposition. Thus, at the time of coating the four (4) batches of the solutions had aged for 17, 18, 19 and 20 days respectively.

Commercially available 15.24 cm×15.24 cm (6 in×6 in) Vycor glass plates (Corning 7913 glass) were cut into 7.62 cm×5.08 cm (3 in×2 in) sizes and used as the substrates 201. The substrates 201 were cleaned in an ultrasonic bath with "Alconox" solution (supplier: Alconox, Inc; New York), distilled water, and isopropanol (in the same order), dried overnight at 110° C., and cooled in a desiccator to room temperature.

The Vycor substrates 201 were coated from the solutions using a dip coating equipment suitable for controlled linear motion of flat plates. The substrates 201 were dipped into the selected coating solutions 101,102,103,104 in sequence and withdrawn each time at 22.5 cm/min. The sequence of deposition of layers of coatings was such that the solution containing the minimum particle sizes (i.e. the solution which "aged" for 17 days) constituted the first coating; the solution containing the next higher particle size (i.e. the solution which "aged" for 18 days) constituted the second coating; and so on. The time interval between the successive layers was about five minutes to allow drying of the preceding layer at room temperature. The ambient temperature and humidity during deposition was 21° C. and 59 percent, respectively. The substrates were coated by a total of four (4) dippings each in three batches as follows: two dippings each from the 17-day and 18-day aged solutions respectively (hereafter referred to as the Procedure I), two dippings from the 17-day aged solution and one dipping each from the 18-day and 19-day aged solutions in the same order (hereafter referred to as the Procedure II) and one dipping each from the 17-day, 18-day, 19-day and 20-day aged solutions in the same order (hereafter referred to as the Procedure III). After final dipping, the substrates were dried overnight at 110° C. and then subjected to a heat treatment in ambient atmosphere at 600° C. for 2 hours for consolidation of the coatings.

The near-normal reflectance of the heat-treated coatings was measured using a tungsten illumination source and a scanning 1.26-meter Spex UV-visible, grading spectrometer. An Apple II data acquisition system was used to control scanning of the spectrometer, measure reflectance signed levels, and subsequently analyze the raw data and plot the results. Thirty data points were measured in each of the two wavelength regions, 300 to 600 nanometer (nm) and 500 to 800 nm. A filter for blocking radiation below 450 nm was inserted in front of the spectrometer during scanning of the upper region to avoid possible second-order interference from radiation in the 300 to 400 nm regime. Lamp intensity was too weak at wavelengths below 350 nm to give useful results and hence the results were plotted between 350 nm (near UV) and 800 nm (near IR). Since the light source and the spectrometer system efficiency were not uniform with wavelength, a normalization procedure was required to calculate single-surface reflectance from the double-surface reflected intensity data. This normalization was done by measuring the reflectance of the uncoated Vycor substrate. The measured coating reflectances were then ratioed to the substrate reflectance and a constant factor used to convert the result to the effective single-surface percent reflectance.

The coatings produced by Procedure I showed antireflectivity over narrow bandwidths (FIG. 3), with minima approximately at 360 nm and 565 nm because the antireflective coating 206 was deposited from 17-day and 18-day aged solutions only; thus the difference in the particle size distribution was not large enough to produce any significant porosity gradient across the thickness of the coating. However, the Procedure II sample showed broadband antireflectivity with almost zero reflectance in the lower wavelength region up to 410 nm (FIG. 4). The Procedure III sample also showed broadband antireflectivity (FIG. 5). In this case the antireflectivity property was manifested in the higher wavelength region starting at approximately 450 nm. The dotted line in FIGS. 3, 4, and 5 indicates the % reflectance for an uncoated substrate.

EXAMPLE 2

The solution preparation procedure of Example 1 is repeated using a mixture of the following chemicals: 1 mole $Si(OCH_3)_4$, 50 mole $CH_3OH$ and 2 mole $H_2O$; and the number of dippings increased to produce the desired thickness of coating from each solution. Similar antireflectivity results are obtained.

EXAMPLE 3

The solution preparation procedure of Example 1 is repeated using the following chemicals: 1 mole $Si(OCH_3)_4$, 25 moles $CH_3OH$, 2 moles $H_2O$ and 5 drops concentrated hydrochloric acid; and the number of dippings increased to obtain the desired coating thickness from each solution. Similar results are obtained.

EXAMPLE 4

The solution preparation procedure of Example 1 is repeated using the following chemicals: 1 mole $Si(OCH_3)_4$, 50 moles $CH_3OH$, 2 moles $H_2O$ and 2 drops concentrated ammonium hydroxide; and the number of dippings adjusted to obtain the desired coating thickness from each solution. Similar results are obtained.

EXAMPLE 5

The solution preparation procedure of Example 1 or 2 or 3 or 4 is repeated after substituting tetraethoxysilane, $Si(OC_2H_5)_4$ for $Si(OCH_3)_4$. Similar results are obtained.

EXAMPLE 6

The solution preparation procedure of Example 1 or 2 or 3 or 4 is repeated after substituting ethanol, $C_2H_5OH$ for methanol, $CH_3OH$. Similar results are obtained.

EXAMPLE 7

The solution preparation procedure coating deposition procedure of Example 1 or 2 or 3 or 4 or 5 or 6 is repeated but the coating is heated preferably at 500° C. or less at the ambient atmosphere for a period preferably not exceeding 10 hours. Similar results are obtained.

EXAMPLE 8

The solution preparation procedure and coating deposition procedure of Example 1 or 2 or 3 or 4 or 5 or 6 is repeated, but the coating is heated, preferably at 500° C. or less in an oxidizing atmosphere or by oxygen plasma for a period preferably not exceeding 10 hours. Similar results are obtained.

EXAMPLE 9

The procedures of Example 1 or 2 or 3 or 4 or 5 or 6 or 7 or 8 are repeated except that coating deposition is done by state of the art spinning process. Similar results are obtained.

EXAMPLE 10

The procedures of Example 1 or 2 or 3 or 4 or 5 or 6 or 7 or 8 are repeated except that coating deposition is done by any state of the art spraying process. Similar results are obtained.

EXAMPLE 11

A series of solutions is made where each individual solution is made by the procedures of Examples 1, 2, 3 and 4 respectively. These are used for coating with the other processing steps of the examples repeated. Similar results are obtained.

The results demonstrate that the method of the present invention can be used to tailor broadband antireflectivity properties of the antireflective coating 206 in the wavelength region of interest by suitably adjusting the following process parameters.

(I) The solution preparation parameters such as the meter ratio of water to the alkoxide, solution concentration (i.e. gram equivalent oxide(s) per 100 ml solution), the presence of a catalyst such as an acid (like hydrochloric acid, HCl or nitric acid $HNO_3$) or a base (like ammonium hydroxide, $NH_4OH$), temperature, etc; and duration of aging.

(II) Number of solutions with increasing particle sizes used for coating deposition.

(III) Deposition sequence from the solutions.

(IV) Thermal treatment schedules adapted to produce the finished coating (i.e. temperature and time).

The invention can be further generally described as a process for producing broadband antireflective coatings that comprises preparing a plurality of solutions of an alkoxide precursor material by reacting an alkoxide or alkoxide mixture with water with or without a catalyst at conditions adapted to produce a series of solutions containing particles of a different size in each solution so that the series of solutions has one solution of a smallest size and one or more solutions each having increasing sizes. As a next step the method provides for a substrate and deposits one or more layers of a first coating over the substrate from the solution having the smallest particle size. In the next step there are deposited one or more layers of an additional coating over the first coating from the solution having the next largest particle size. One can further optionally deposit one or more additional coatings each having one or more layers over the coating obtained from solutions having increasing particle sizes. Finally the plurality of deposited coatings from the above steps is thermally treated to obtain a consolidated antireflective coating 206.

More specifically the invention can be described as a process to produce a broadband antireflective coating by preparing a plurality of coating solutions by the steps of mixing an alkoxide represented by the general formula $M(OR)_x$ where M is a metal atom selected from the group consisting of silicon, aluminum, titanium, niobium, and a mixture thereof, wherein R is an alkyl group having from one to five carbon atoms and x is the valency of the metal atom; with water, $H_2O$; with an organic solvent selected from the group consisting of alcohols, $R_1$—OH, and ketones,

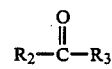

or mixtures thereof, where $R_1$ is an alkyl group having from one to five carbon atoms and $R_2$ and $R_3$ are alkyl groups having from one to two carbon atoms; and with an optional catalyst; and providing a substrate adapted for coating by the prepared solutions; and depositing one or more layers of the solution having the smallest particle size onto the substrate to form a gel coating; and depositing one or more layers with the solution having the next largest particle size over the gel coating to form a second by optionally depositing one or more layers of one or more gel coatings over the second gel coating; and thermally treating the deposited coatings to obtain a consolidated antireflective coating.

The method has the option of using no catalyst, an acid catalyst, a basic catalyst, or both an acid and basic catalyst in the different solutions to obtain different particle sizes therein. Alternatively, sequential preparation and aging may be used alone. Optionally, a dopant oxide as discussed earlier may also be used.

While the forms of the invention herein disclosed constitute presently preferred embodiments for producing gradient-index silica coatings, many other oxide coatings or a mixture thereof are possible as long as the procedures involve deposition of layers from a series of solutions with increasing particle size in each subsequent solution. For example coating solutions can be prepared from suitable precursors of alumina ($Al_2O_3$), zirconia ($ZrO_2$), titania ($TiO_2$) or the like or the mixture thereof and those solutions can be used for producing gradient-index antireflective coatings by the method of the invention. Therefore, it is not intended herein t mention all the possible equivalent forms or ramifications of the invention. It is to be understood that the examples used herein are merely descriptive rather than limiting, and that various changes in terms of the solution compositions, coating deposition method (and parameters), and thermal treatment parameters may be made without departing from the spirit and scope of the invention.

I claim:

1. A process for producing broadband antireflective coatings comprising:
   a. preparing a plurality of solutions of an alkoxide precursor material by reacting an alkoxide or alkoxide mixture with water with or without a catalyst at conditions adapted to produce a series of solutions containing particles of a different size in each solution so that the series of solutions has one solution of a smallest size and one or more solutions each having increasing sizes, wherein the alkoxide is represented by the general formula $M(OR)_x$ where M is a metal atom, R is an alkyl group, having from one to five carbon atoms, and x is the valency of the metal atom, and whereby the plurality of solutions are aged or have increased solution pH so as to obtain solutions having different particle size ranges and the alkoxide or alkoxide mixture is selected from the group consisting of the alkoxides of silicon, aluminum, titanium, tantalum, niobium, or zirconium;

b. providing a substrate and depositing and drying one or more layers of a first coating over the substrate from the solution having the smallest particle size;

c. depositing and drying one or more additional coatings each having one or more layers over the coating obtained in step B. from solutions having increasing particle sizes; and d. thermally treating the plurality of deposited coatings from the above steps to obtain a consolidated antireflective coating with a porous structure, wherein the thermal treatment is below the temperature at which the porous structure of the coating will collapse.

2. The process of claim 1 whereby the plurality of solutions in step a. are prepared sequentially and aged so as to obtain solutions having different particle size ranges.

3. The process of claim 1 whereby the plurality of solutions in step a. are prepared by use of catalysts adapted to obtain solutions having different particle size ranges.

4. The process of claim 1 whereby the step of thermally treating the deposited coating further comprises treating at a temperature below 900° C.

5. The process of claim 1 whereby a dopant alkoxide is added to step a. that is selected form the group consisting of the alkoxides of boron, phosphorous, germanium and a mixture thereof.

6. A process for producing a broadband antireflective coating comprising:
 a. preparing a plurality of coating solutions by the steps of mixing;
  1. an alkoxide represented by the general formula $M(OR)_x$ where M is a metal atom selected form the group consisting of silicon, aluminum, titanium, tantalum, niobium, zirconium and a mixture thereof, where R is an alkyl group having from one to five carbon atoms and x is the valency of the metal atom;
  2. water, $H_2O$;
  3. an organic solvent selected form the group consisting of alcohols; $R_1$-OH, and ketones

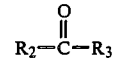

or mixtures thereof, where $R_1$ is an alkyl group having from one to five carbon atoms and $R_2$ and $R_3$ are alkyl groups having from one to two carbon atoms, whereby the plurality of solutions in step a. are aged or have increased solution pH so as to obtain solutions having different particle size ranges;

b. providing a substitute adapted for coating by the prepared solutions;

c. depositing and drying one or more layers of the solution having the smallest particle size onto the substrate to form a gel coating;

d. depositing and drying one or more gel coatings each having one or more layers over the gel coating of step c.; and e. thermally treating the deposited coatings to obtain a consolidated antireflective coating with a porous structure, wherein the thermal treatment is below the temperature at which the porous structure of the coating will collapse.

7. The process of claim 6 whereby the plurality of solutions in step a. are prepared sequentially and aged so as to obtain solutions having different particle size ranges.

8. The process of claim 6 whereby the plurality of solutions in step a. are prepared by use of catalysts adapted to obtain solutions having different particle size ranges.

9. The process of claim 6 whereby the step of thermally treating the deposited coating further comprises treating at a temperature below 900° C.

10. The process of claim 6 whereby a dopant alkoxide having the general formula $M_d(OR)_x$ where $M_d$ is a dopant atom selected from the group consisting of boron, phosphorous, germanium, and a mixture thereof, wherein R is an alkyl group having from one to five carbon atoms and x is the valency of the dopant atom, is mixed with the alkoxide of step a.1.

11. The method of claim 3 or 8 whereby an acid catalyst is used.

12. The method of claim 3 or 8 whereby a basic catalyst is used.

13. The method of claim 3 or 8 whereby an acid catalyst is used in one set of solutions and a basic catalyst in another set.

* * * * *

UNITED STATES PATENT AND TRADEMARK OFFICE
CERTIFICATE OF CORRECTION

PATENT NO. : 4,830,879

DATED : May 16, 1989

INVENTOR(S) : Jagadish Debsikdar

It is certified that error appears in the above—identified patent and that said Letters Patent is hereby corrected as shown below:

Column 1, line 59, delete "NH$_4$F.HF" insert --NH$_4$F•HF--

Column 2, line 16, delete "NH$_4$F.HF" insert --NH$_4$F•HF--

Column 3, line 17, delete "maybe" insert --may be--

Column 6, line 66, after "dependant on" insert --the chemical--

Column 10, line 32, after "second" insert --gel coating. Additional coatings can be produced--

Column 10, line 53, delete "t" insert --to--

Column 11, line 22, delete "B" insert --b--

Column 12, line 17, delete "subsitute" insert --substrate--

Signed and Sealed this

Twenty-fifth Day of May, 1993

Attest:

MICHAEL K. KIRK

Attesting Officer

Acting Commissioner of Patents and Trademarks